United States Patent Office 3,333,435
Patented Aug. 1, 1967

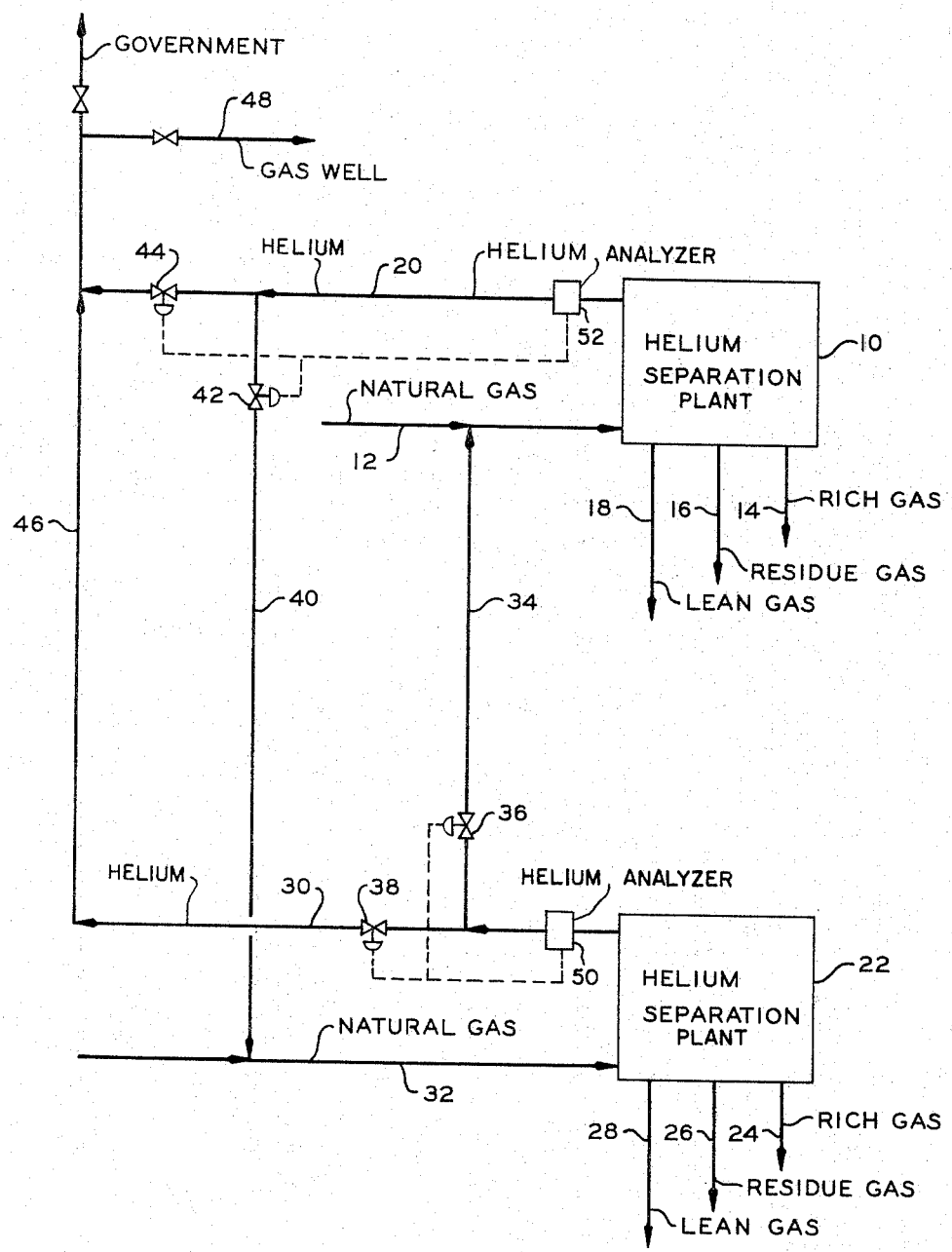

3,333,435
PROCESS AND APPARATUS FOR HANDLING OFF-SPECIFICATION HELIUM
Horace M. Stewart, Phillips, Tex., assignor to Phillips Petroleum Company, a corporation of Delaware
Filed Aug. 28, 1964, Ser. No. 392,739
4 Claims. (Cl. 62—23)

This invention relates to a process and apparatus for handling off-specification helium in a helium plant utilizing at least 2 helium recovery units.

In the separation of helium from natural gas in two plants, it is conventional practice to pass the helium, when it is on-specification, that is above about 50 percent helium, to the Government. When the helium from the plant is not specification material, it is passed to gas wells, and the gas from the wells is later processed for helium. When one plant is making specification helium product and another plant is not making specification product, in some instances it may be possible to add the off-specification product from one plant to the specification product of the other plant and have a mixed stream that is on-specification. However, in other instances, the mixed streams will not be on-specification. As mentioned above, in the case of the mixed streams not being on-specification, the gas is passed to gas wells.

This invention is concerned with a novel process and apparatus for handling off-specification helium in a multiple plant installation such as that existing in the Sherman Plant of Phillips Petroleum Company in the Texas Panhandle.

Accordingly it is an object of the invention to provide an improved process and apparatus for handling off-specification helium in a multiple plant installation. Another object is to provide a method and apparatus for processing or handling off-specification helium obtained from one of a plurality of plants separating helium from natural gas when said one plant is being placed on stream, initially, or after a temporary shutdown. Other objects of the invention will become apparent to one skilled in the art upon consideration of the accompanying disclosure.

In a multiple plant helium installation, there are occasional shutdowns of one of the plants while the other plant or plants are on stream producing specification grade helium. Shutdowns are caused by failure of compressors, icing up of heat exchangers due to too high a water content in the stream undergoing heat exchange, and other similar malfunctioning or failure of equipment.

A broad aspect of the invention comprises passing off-specification helium-rich effluent from one of the plants to the feed stream (natural gas) to one of the other plants which is on stream producing specification grade helium-rich gas. After a shutdown for any reason, the plant requires about 5 hours to reach a helium concentration of 2-3 mole percent in the helium-rich product stream, 10 hours to reach a helium concentration of 25-30 mole percent, and about 15 hours to reach a concentration of 50 percent which is acceptable as specification grade. During this period, the sub-standard helium-rich stream from the plant starting up is passed to the feed inlet of a plant in the installation which is producing specification grade helium.

A more complete understanding of the invention may be had by reference to the accompanying schematic drawing which is a flow in a two plant installation.

Referring to the drawing a first helium separation plant 10 is provided with a natural gas feed line 12 and effluent lines 14, 16, 18 and 20 for a gas stream rich in gasoline, a residual gas stream, a lean gas stream, and a gas stream rich in helium, respectively. A second helium separation plant 22 is provided with corresponding effluent lines 24, 26, 28, and 30 for a stream rich in natural gasoline, a stream of residue gas, a stream of lean gas, and a stream rich in helium, respectively. A natural gas feed line 32 connects with the feed inlet of plant 22.

A conduit 34 containing a control valve 36 connects effluent line 30 with feed line 12 just upstream of a flow control valve 38 in line 30. By closing valve 38 and opening valve 36, helium-rich gas from plant 22 is passed thru line 34 into feed line 12 of plant 10.

A conduit 40 connects helium effluent line 20 of plant 10 with feed line 32 of plant 22. Valves 42 and 44 provide the necessary control for passing the helium-rich gas either to feed line 32 or to helium delivery line 46 passing to a Government pipe line. Line 48 is provided for distribution of the gas in line 46 to a gas well when the effluent helium streams of both plants are below specification grade and the gas from the well is reprocessed when the plants are on stream producing specification grade helium.

A helium analyzer 50 in helium line 30 is in control of valves 36 and 38 and closes valve 38 and opens valve 36 when the sensed helium concentration is below some set value such as 50 volume percent of the gas in line 30. When the helium concentration reaches the set value (50 volume percent), valves 38 and 36 are reversed so as to pass the helium rich stream in line 30 directly to line 46.

In a similar manner, helium analyzer 52 in helium line 20 functions to pass specification grade helium gas from line 20 directly into line 46 and below specification grade helium gas into line 32 leading to plant 22 by controlling valves 42 and 44.

The details of plants 10 and 12 are immaterial to the invention and have not been fully disclosed. However, these plants are substantially the same as disclosed in U.S. Patent 3,130,027 to E. A. Harper and the copending application of Leland G. Kitchen, S.N. 218,985 filed Aug. 23, 1962, now U.S. Patent 3,148,966.

The invention substantially as described and shown in the drawing has been in use in the Sherman plant for a substantial period of time and has been effective in conservation of helium. The simplicity and economical advantage of the process and arrangement of apparatus contribute materially to the value of the invention.

Certain modifications of the invention will become apparent to those skilled in the art and the illustrative details disclosed are not to be construed as imposing unnecessary limitations on the invention.

I claim:
1. A process for recovering helium from natural gas containing helium comprising the steps of:
  (a) passing a first stream of said gas to a first helium separation plant and recovering a helium-rich stream therefrom in which the concentration of helium is of specification grade;
  (b) passing a second stream of said gas to a second helium separation plant during start-up after a shutdown to recover a second helium-rich gas stream having a helium concentration below specification grade;
  (c) passing the helium-rich gas stream of step (b) to the first plant of step (a) in admixture with said first stream until the second helium-rich gas stream of step (b) reaches specification grade; and
  (d) after the second helium-rich gas stream of step (b) reaches specification grade, discontinuing step (c) and separately recovering same as a product of said second plant.

2. The process of claim 1 wherein specification grade is at least 50 mol percent of helium.

3. The process of claim 2 wherein said second plant is on start-up in the first 10 to 15 hours after shutdown.

4. Apparatus comprising in combination:
  (1) a first helium separation plant having a natural gas feed line and helium-rich gas outlet line;

(2) a second helium separation plant having a natural gas feed line and a helium-rich gas outlet line;
(3) a first conduit connecting the outlet line of (1) with the feed line of (2);
(4) a second conduit connecting the outlet line of (2) with the feed line of (1);
(5) valve means in the outlet line of (1) downstream of the first conduit of (3) and in said first conduit for passing helium-containing effluent gas to the second plant of (2);
(6) valve means in the outlet line of (2) downstream of the second conduit of (4) and in said second conduit for passing helium-containing effluent gas to the first plant of (1);
(7) a helium analyzer in the outlet line of (1) in control of the valve means of (5) for switching flow in said outlet line to the feed line of (2) when the helium concentration in said outlet line of (1) is below a predetermined minimum; and
(8) a helium analyzer in the outlet line of (2) in control of the valve means of (6) for switching flow in said outlet line to the feed line of (1) when the helium concentration in said outlet line of (2) is below a predetermined minimum.

References Cited

UNITED STATES PATENTS

| | | | |
|---|---|---|---|
| 3,160,489 | 12/1964 | Brocoff et al. | 62—21 |
| 3,205,669 | 9/1965 | Grossmann | 62—23 |
| 3,210,950 | 10/1965 | Lady | 62—21 |

NORMAN YUDKOFF, *Primary Examiner.*

V. W. PRETKA, *Assistant Examiner.*